US011466619B2

(12) United States Patent
Guillou et al.

(10) Patent No.: US 11,466,619 B2
(45) Date of Patent: Oct. 11, 2022

(54) METHOD OF MANUFACTURING A HEAT EXCHANGER FOR A TURBINE ENGINE

(71) Applicant: SAFRAN AIRCRAFT ENGINES, Paris (FR)

(72) Inventors: Lancelot Guillou, Moissy-Cramayel (FR); Stéphane Louis Lucien Auberger, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/251,991

(22) PCT Filed: Jun. 13, 2019

(86) PCT No.: PCT/FR2019/051426
§ 371 (c)(1),
(2) Date: Dec. 14, 2020

(87) PCT Pub. No.: WO2019/239070
PCT Pub. Date: Dec. 19, 2019

(65) Prior Publication Data
US 2021/0254549 A1     Aug. 19, 2021

(30) Foreign Application Priority Data
Jun. 14, 2018 (FR) ...................... 1855246

(51) Int. Cl.
 *B21D 53/06* (2006.01)
 *F02C 7/12* (2006.01)
(52) U.S. Cl.
 CPC ............. *F02C 7/12* (2013.01); *B21D 53/06* (2013.01); *F05D 2220/32* (2013.01); *F05D 2260/213* (2013.01)

(58) Field of Classification Search
 CPC ....... F02C 7/12; B21D 53/06; F05D 2220/32; F05D 2260/213; F05D 2230/24;
 (Continued)

(56) References Cited

U.S. PATENT DOCUMENTS 5,490,559 A * 2/1996 Dinulescu ................. F28B 1/06
 165/148
10,345,057 B2 * 7/2019 Storage ................... F16K 11/02
 (Continued)

OTHER PUBLICATIONS

International Search Report dated Sep. 18, 2019, issued in corresponding International Application No. PCT/FR2019/051426, filed Jun. 13, 2019, 2 pages.
(Continued)

Primary Examiner — Lawrence Averick
(74) Attorney, Agent, or Firm — Christensen O'Connor Johnson Kindness PLLC

(57) ABSTRACT

A method for manufacturing an annular heat exchanger intended to be mounted on the radially inner or outer face of an annular shell of a casing of a double-flow turbomachine, the method including: obtaining by extrusion a heat exchanger preform by a die shaped so that the preform includes: first pipes for the circulation of a fluid to be cooled, second pipes arranged on either side of the first pipes in a direction perpendicular to the direction of extrusion; making a hole from the outside in the preform, the hole leading into one of the second pipes of the preform; and introducing into the hole of the second given pipe a member for partially closing off its passage cross-section.

10 Claims, 4 Drawing Sheets

(58) Field of Classification Search
CPC .......... F28F 2280/00; F28F 2275/00–2275/22; B29L 2031/18; F05B 2260/20; F05B 2230/00–2230/90
See application file for complete search history.

(56) References Cited

U.S. PATENT DOCUMENTS

| | | | |
|---|---|---|---|
| 11,066,997 B2* | 7/2021 | Potel | F01M 5/002 |
| 2006/0168812 A1* | 8/2006 | Insalaco | F28F 1/022 |
| | | | 29/890.05 |
| 2014/0044525 A1* | 2/2014 | Storage | F28F 17/00 |
| | | | 415/144 |
| 2018/0087852 A1* | 3/2018 | Storage | F28D 1/0233 |
| 2018/0281048 A1* | 10/2018 | Yang | F02C 9/18 |
| 2019/0219337 A1* | 7/2019 | Twelves | F02C 7/185 |
| 2019/0390602 A1* | 12/2019 | Potel | F02C 7/06 |

OTHER PUBLICATIONS

Written Opinion of the International Searching Authority dated Sep. 18, 2019, issued in corresponding International Application No. PCT/FR2019/051426, filed Jun. 13, 2019, 5 pages.
Written Opinion of the International Searching Authority dated Sep. 18, 2019, issued in corresponding International Application No. PCT/FR2019/051426, filed Jun. 13, 2019, 6 pages.
International Preliminary Report on Patentability dated Dec. 15, 2020, issued in corresponding International Application No. PCT/FR2019/051426, filed Jun. 13, 2019, 1 page.

* cited by examiner

METHOD OF MANUFACTURING A HEAT EXCHANGER FOR A TURBINE ENGINE

FIELD OF THE INVENTION

The present invention relates to a method of manufacturing an annular heat exchanger for a turbomachine, in particular an annular heat exchanger intended to be mounted in a secondary air flow stream.

BACKGROUND OF THE INVENTION

FIG. 1 shows a double-flow turbomachine 10 with moving parts that rub against other moving parts or against fixed parts, e.g. a bearing. In order not to break due to heating due to friction, the parts are sprayed with oil which makes it possible to limit (or contain) their heating and, on the other hand, to lubricate them to facilitate the sliding of the parts one on top of the other.

The oil flows in a circuit provided with heat exchangers, in particular oil/air exchangers 12, as shown in FIG. 2, having a matrix, in the form of a sinuous pipe shaped so as to achieve heat exchange, into which the oil from said parts is introduced and then cooled before being injected again onto said parts. The heat exchanger shown in FIG. 2 is an annular heat exchanger which is mounted on the radially inner or outer face (relative to the longitudinal axis of the turbomachine) of an annular shroud delimiting radially outwards or inwards an annular flow path of a secondary air stream.

When starting a turbine engine in cold conditions (e.g. with a temperature below 0° C.), the oil of the air/oil exchanger 12 (or exchangers if applicable) can be frozen, making heat exchange between oil and air difficult or impossible since the oil cannot circulate in the matrix of the exchanger. It is then necessary to preheat the matrix of the air/oil heat exchanger beforehand.

For this purpose, it is known to provide the air/oil heat exchanger with a bypass pipe used as a defrosting channel and surrounding the matrix of the air/oil heat exchanger in order to heat the frozen oil. This bypass pipe is connected at its upstream end to the intake of the heat exchanger and the outlet of the heat exchanger. The oil circuit also includes a valve for controlling the oil flow in the bypass pipe to allow oil to flow through the matrix of the exchanger only when the temperature is below a predetermined threshold. However, since the oil passage cross-section of the bypass pipe is smaller than the oil passage cross-section in the air/oil heat exchanger, overpressure exists in the oil circuit when the matrix of the heat exchanger is frozen. Overpressure induces a risk of damage to the oil circuit.

In order to reduce this overpressure, it has already been proposed to connect the end of the bypass line to the downstream end of the bypass line in such a way as to divert some of the fluid from the bypass line, thereby reducing the fluid pressure in the bypass line under cold operating conditions. While this solution is interesting, it is however difficult to implement by machining on a heat exchanger since it requires modification of the structural integrity of the heat exchanger and requires the addition of sealing parts that are complex to implement.

The invention more particularly aims at providing a simple, efficient and cost-effective solution to this problem.

SUMMARY OF THE INVENTION

The present invention relates first of all to a process for manufacturing an annular heat exchanger, in particular intended to be mounted on the radially inner or outer face of an annular shell of a casing of a double-flow turbomachine, comprising the following steps:
  obtaining by extrusion a heat exchanger preform by means of a die shaped so that the preform comprises:
    first pipes for the circulation of a fluid to be cooled,
    second pipes arranged on either side of the first pipes in a direction perpendicular to the direction of extrusion,
  making a hole from the outside in the preform, this hole leading into one of the second pipes of the preform,
  introducing into said hole of the second given pipe a member for partially closing off its passage cross-section.

According to the invention, the heat exchanger is made by extrusion, which makes it possible to obtain first and second pipes, the first pipes serving for the circulation of fluid, in particular oil, to be cooled and the second pipes serving for the circulation of defrosting fluid of the frozen fluid which is in the first pipes, which explains the arrangement on either side of the first pipes. In particular, in order to avoid overpressure in the second pipe, a hole is made after the preform is obtained and partially closed, i.e. so that a small fluid passage is left on either side of the shut-off device.

Also, the process may include:
  Making in a middle part of the preform and from the outside of the preform a first fluid inlet aperture leading into only some of the first pipes,
  Making in said middle part of the preform and from the outside of the preform a first fluid outlet aperture opening into said certain first pipes,
  Blocking the flow of fluid in said certain first pipes in the direction of extrusion between said first inlet aperture and said first outlet aperture.

According to a further characteristic, the method may comprise a step of making in a middle portion of the preform and from the outside of the preform a second fluid inlet aperture opening into the second given pipe and a second fluid outlet aperture opening into the second given pipe, said sealing member being interposed along the extrusion direction between the second inlet aperture and the second outlet aperture.

Preferably, the process includes the following steps:
  Adding fluidic bonding members to the ends of the preform so as to:
  create a fluid flow in the first circuit between the first inlet aperture and the first outlet aperture;
  create a fluid flow in the second circuit between the second inlet aperture and the second outlet aperture;
  These fluid connection elements can be obtained in several ways and it is not necessary here to describe a specific realization of them, the man of the trade understanding that machining is in particular one of the techniques that can be used to achieve the desired fluid circulation.

Also, the first inlet aperture can be made by forming a recess in the thickness of the preform followed by making fluid connection holes in said certain first pipes.

In addition, the second inlet aperture can be made by forming said recess followed by making a fluidic connection hole to said second given pipe. Thus, in this configuration, the recess formed in the preform forms the first inlet aperture and the second inlet aperture.

The process may also include a step of adding a sealing plate to the middle part of the preform, this plate being provided with fluid passage cut-outs. The edges of the cut-outs are provided with closed-contour joints that are applied to the preform to create a tight seal.

Also, the sealing plate can be covered with a plate provided with fluid connection ducts for the fluid supply to and the fluid outlet from the first and second pipes.

The invention will be better understood and other details, characteristics and advantages of the invention will appear when reading the following description, which is given as a non-limiting example, with reference to the attached drawings.

DETAILED DESCRIPTION

Figure 1:
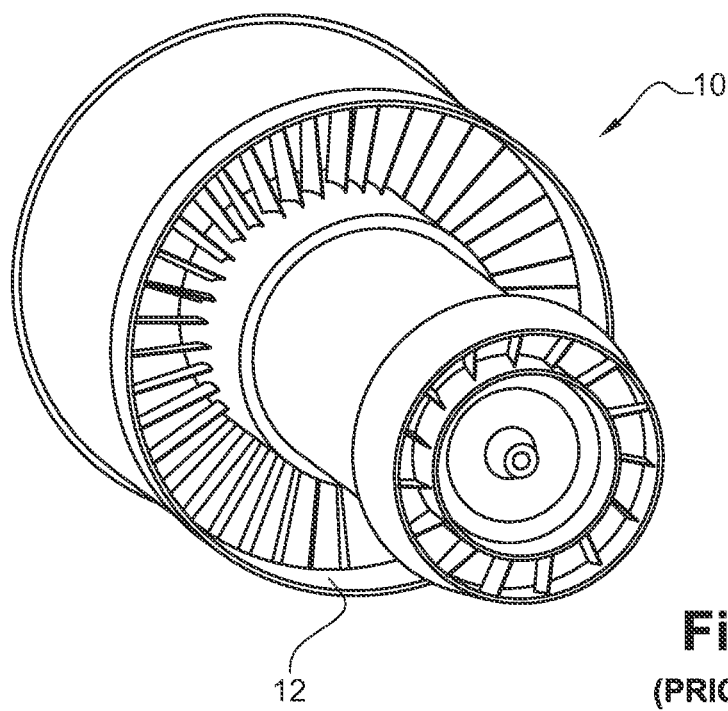
FIG. 1 is a schematic view, in perspective, of a turbomachine according to the known technique.
Figure 2:
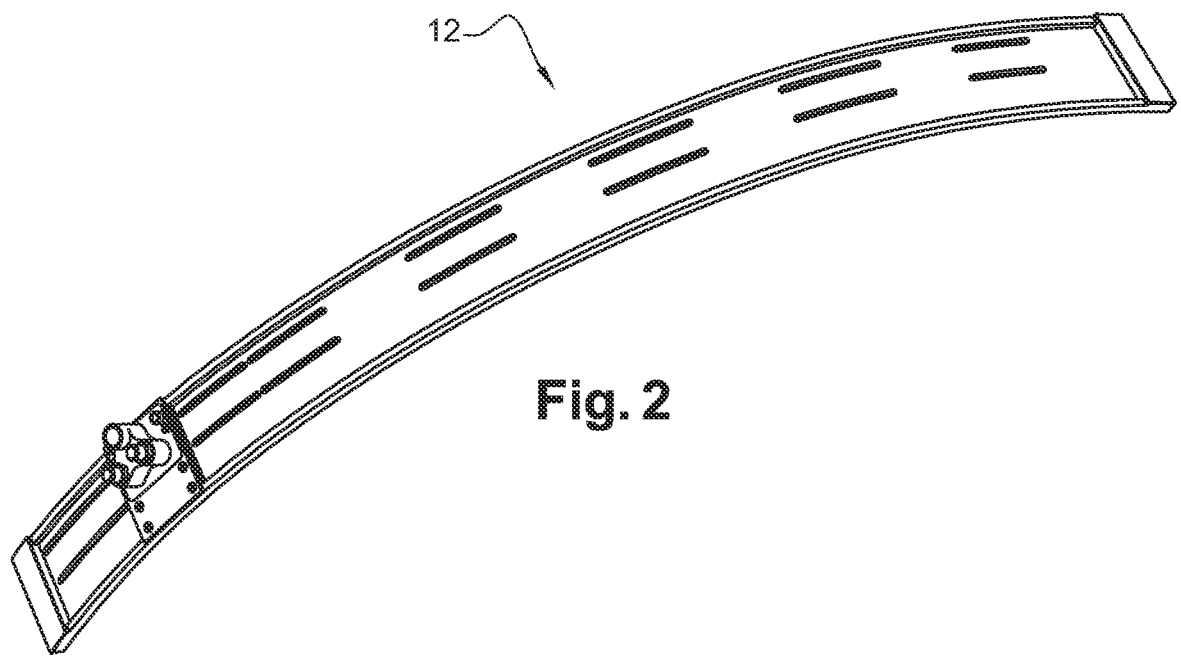
FIG. 2 is a schematic view, in perspective, of a part of an annular heat exchanger mounted in the turbomachine in FIG. 1.
Figure 3:
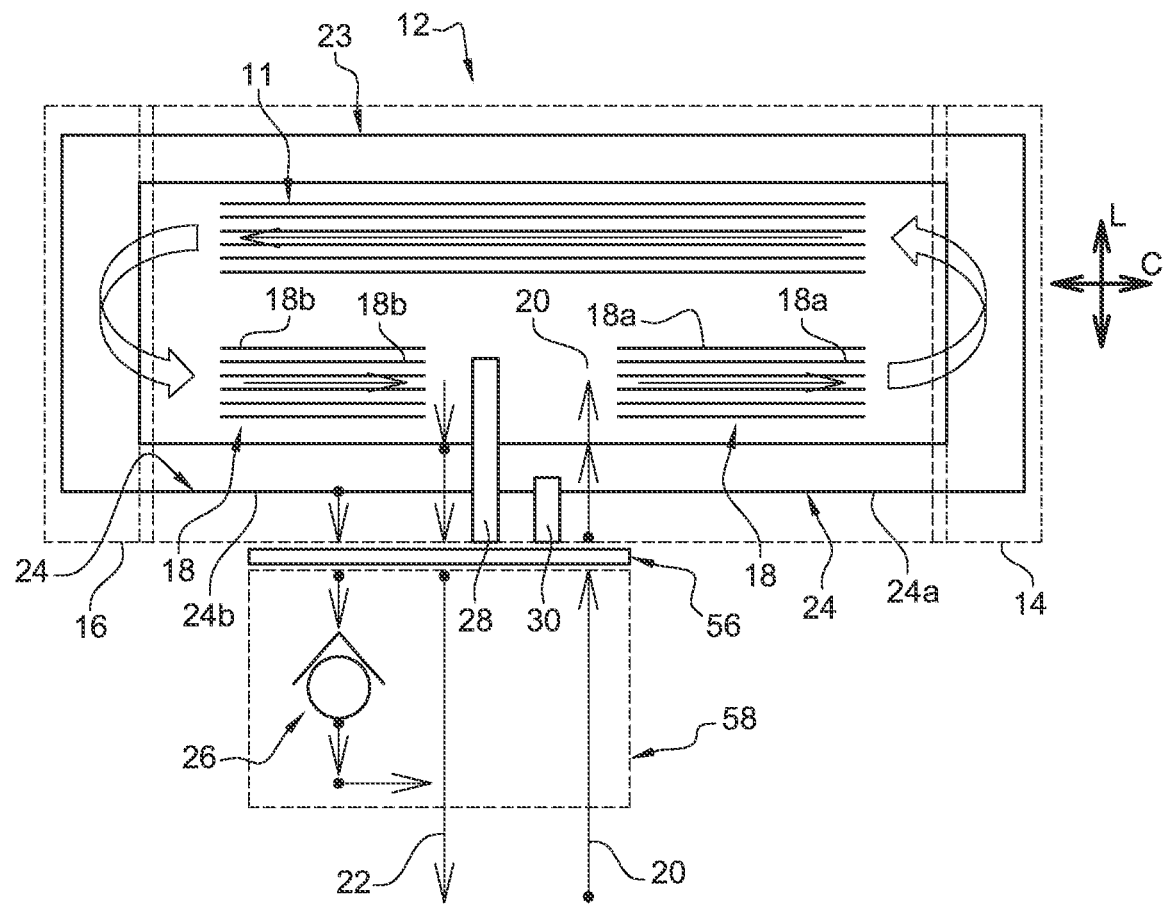
FIG. 3 is a schematic view of a heat exchanger to be made with the process according to the invention and which shows more particularly the oil flow.

FIG. 3 shows schematically the principle of circulation of a fluid to be cooled, in particular oil, in a heat exchanger 12 as shown in FIG. 2. As shown, the exchanger comprises a first circuit formed of first pipes 11 and 18 for the circulation of oil to be cooled and a second circuit formed of second pipes 23 and 24 for the circulation of defrosting oil from the first pipes 11 and 18. Exchanger 12 is an annular exchanger that extends around the axis of the turbomachine. FIG. 3 shows the longitudinal dimension of the exchanger in the L direction and the circumferential dimension of the exchanger in the C direction.

As can be seen, some of the first pipes 11 extend between two fluid connection members 14, 16, while other first pipes 18 comprise a first portion 18a and a second portion 18b. The first portions 18a of the first pipes 18 are connected at their upstream ends to a common oil supply inlet 20 and at their downstream ends to the first fluid connection member 14. The first pipes 11 are connected upstream to the first fluid connection element 14 and downstream to the second fluid connection element 16. The outlet of the second fluid connection member 16 is connected to the second portions 18b of the first pipes 18 whose downstream ends are connected to an oil outlet 22.

The second pipes 23, 24, in this case two, are formed on either side of the first pipes 11, 18 in longitudinal direction L. One of the second pipes 23 extends between the first 14 and second 16 fluid connection elements. The other 24 of the second pipes includes a first portion 24a connected to an oil inlet which is here the same oil inlet 20 as that feeding the first portions 18a of the first pipes 18. The downstream end of the first portion 24a of the second pipe 24 is connected to the first fluidic connection member 14 which feeds as input the second pipe 23, which second pipe 23 in turn feeds oil to the second fluidic connection member 16 communicating as output with the second portion 24b of the second pipe 24. At the outlet, this second portion 24b of the second pipe 24 is connected to an open/close valve 26, which allows or prohibits the flow of oil into the second pipes 23, 24. Thus, valve 26 allows or prevents the circulation of oil in the channel surrounding the first pipes 11, 18 in order to heat them up in case they freeze under cold operating conditions. This defrosting channel is formed by the first portion 24a of the second pipe 24, the first fluid connection member 14, the second pipe 23, the second fluid connection member 16, the second portion 24b of the second pipe 24.

Also visible in FIG. 3 is a separator 28 designed to fluidly separate the first portions 18a and second portions 18b of the first pipes 18 and a partial shut-off pin 30 for the second pipe 24, the interest of these parts appearing completely below.

To prevent overpressure in the defrosting pipe, an oil bypass is provided between inlet 20 and outlet 22 of the defrosting pipe. Thus, part of the oil can flow directly from the upstream end of the first portion 24a of second pipe 24 to the downstream end of the second portion 24b of second pipe 24 without passing through the second pipe 23 since pin 30 partially blocks the fluid passage section and delimits a bypass channel 31 of the defrosting channel.

Figure 4:
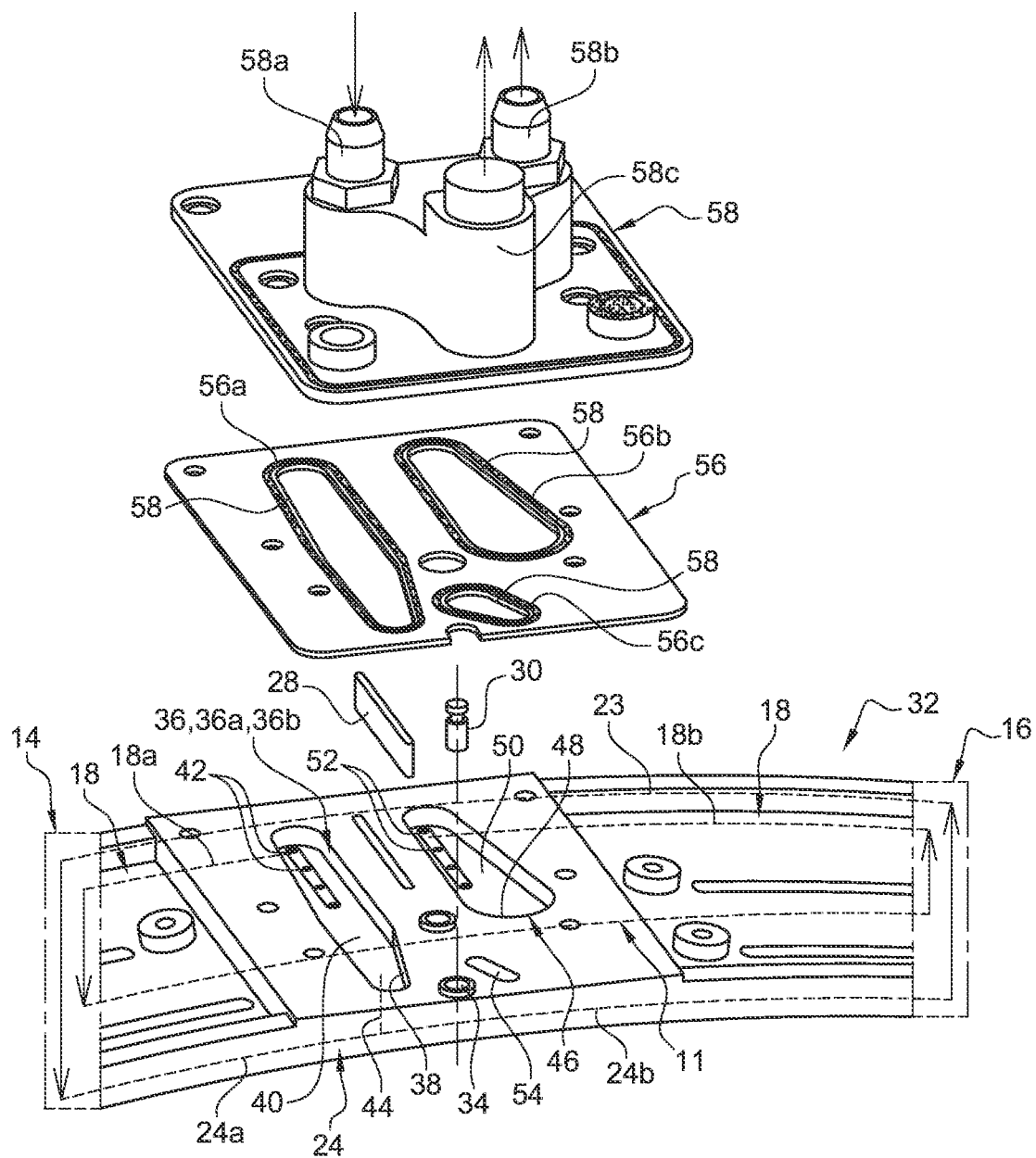
FIG. 4 is a schematic view, in perspective, of the various parts of the heat exchanger according to the method of the invention.
Figure 5:
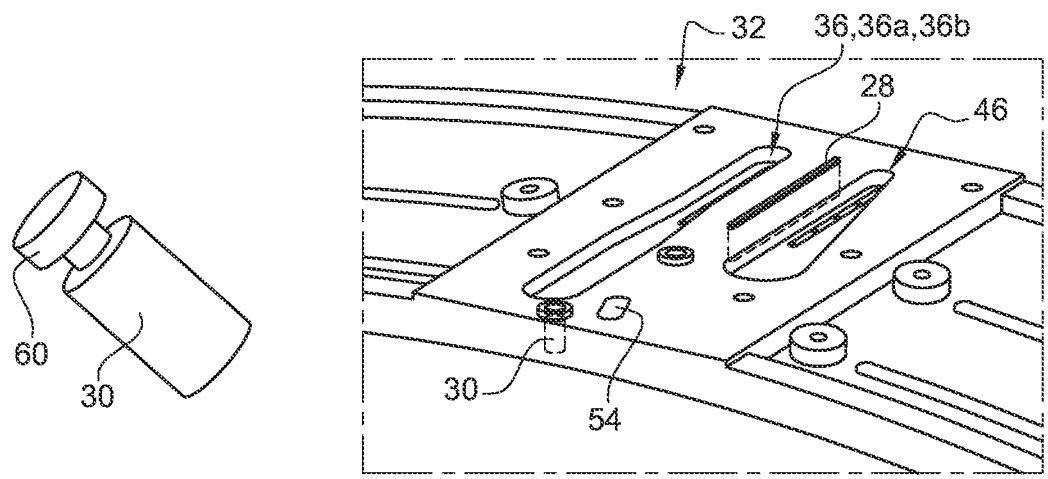
FIG. 5 is a schematic view, in perspective, showing the installation of a partial shut-off pin for a second circuit pipe.

FIGS. 4 and 5 are now described. In order to make the heat exchanger 12 thus described above, the process according to the invention proposes first of all to provide a block ready to be inserted into a die and to make a preform by extrusion, which preform 32 is shaped so as to comprise:

first pipes 11, 18 for the circulation of a fluid to be cooled (only a first pipe 11 and a first pipe 18 are shown in dotted line in FIG. 4), second pipes 23, 24 arranged on either side of the first pipes 11, 18 in a direction perpendicular to the direction of extrusion.

The first pipes 11, 18 and the second pipes 23, 24 are parallel to each other. The first pipes 11, 18 thus extend from one end to the other of the preform 32 obtained immediately after extrusion. The same applies to the second pipes 23, 24 which surround the first pipes 11, 18. In the application of the heat exchanger 12 shown here, there is only one second pipe 23, 24 on either side of the first pipes 11, 18, although there could be more.

In a later step, a hole 34 is drilled from the outside of preform 32, this hole 34 opening into the second given pipe 24. Specifically, this hole 34 separates the first portion 24a of the second pipe 24 and the second portion 24b of the second pipe 24 as described above. In order to carry out the above-mentioned bypass without it interfering with the nominal operation of the defrosting pipe, a member 30, here a pin, is inserted into hole 34 to partially block the flow section of the second pipe 24.

At this stage of preparation of the preform, the latter has first and second pipes which lead to the circumferential ends of the preform. However, there is no oil inlet or outlet yet.

Thus, an opening 36 is made in a middle part in a direction perpendicular to the preform 32. This opening 36 comprises a recess 38 in the bottom 40 of which are drilled holes 42 opening into the first portions 18a of the first pipes 18. Another hole 44 is also drilled in the bottom 40 of recess 38 and communicates with the upstream end of the first portion 24a of second pipe 24. Thus, recess 38 and holes 42 form a first oil inlet aperture 36a of the first circuit. Also, recess 38 and hole 44 form a second oil inlet aperture 36b of the second circuit.

In order to allow an oil outlet, a first oil outlet aperture 46 is also made which comprises a recess 48 formed in the thickness of the preform 32 and in the bottom 50 of which are made oil outlet holes 52 of the second portions 18b of first pipes 18.

To prevent oil from flowing between the first 18a and second portions 18b of the first pipes 18, a separator 28 is inserted between the first oil inlet aperture 36a and the first oil outlet aperture 46, in the direction perpendicular to the extrusion.

Also, a second oil outlet aperture 54 is made and allows oil to exit from the downstream end of the second portion 24b of second pipe 24.

Thus made, the preform, when combined with the first 14 and second 16 fluid connection members, allows to form the heat exchanger 12 delimiting the first oil circuit for oil cooling and the second oil circuit for defrosting the first oil circuit.

As shown in FIG. 4, a sealing plate 56 is inserted between the middle part of preform 32 and a collecting plate 58. The sealing plate 56 comprises three cut-outs, a first cut-out 56a intended to surround the periphery of recess 38, a second cut-out 56b intended to surround the periphery of recess 48 and a third cut-out 56c intended to surround the outlet aperture 54. Seals 58 are mounted on the periphery of the first, second and third cut-outs 56a, 56b, 56c and seal on preform 32. The collection plate 58 includes an oil supply pipe 58a from recess 38 to supply oil to the first and second circuits and an oil outlet pipe 58b from recess 48. It also includes a oil outlet duct 58c from the second oil outlet aperture 54.

Figure 6:
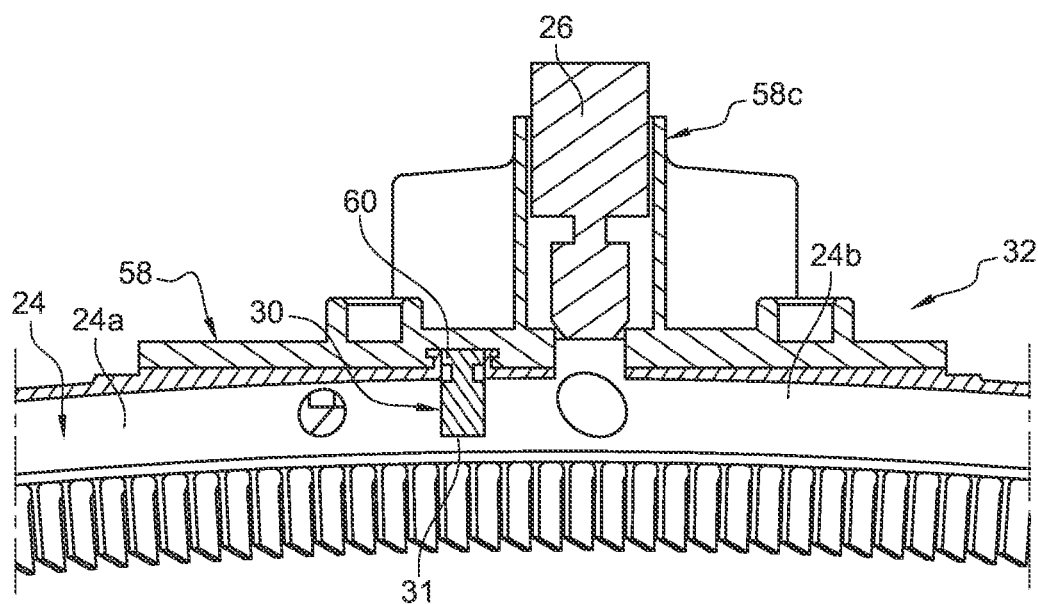
FIG. 6 is a schematic sectional view of the assembly of parts in FIG. 4.

FIG. 6 shows a sectional view of the parts represented in FIGS. 4 and 5. In this figure, it can be seen that the partial plugging pin 30 of the second given pipe 24 is blocked in translation by the collecting plate 58 and by a flat 60 resting on the preform 32.

The invention claimed is:

1. A method for manufacturing an annular heat exchanger intended to be mounted on the radially inner or outer face of an annular shell of a casing of a double-flow turbomachine, the method comprising:
   obtaining by extrusion along a direction of extrusion a heat exchanger preform by a die shaped so that the preform comprises:
      first pipes for the circulation of a fluid to be cooled;
      second pipes arranged on either side of the first pipes in a direction perpendicular to the direction of extrusion, the first pipes being parallel to the second pipes;
   making a hole from the outside in the preform, said hole leading into one of the second pipes of the preform; and
   introducing into said hole of the one of said second pipes a member for partially closing off its passage cross-section.

2. The method according to claim 1, comprising:
   making in a middle part of the preform and from the outside of the preform a first fluid inlet aperture opening into at least one of said first pipes;
   making in said middle part of the preform and from the outside of the preform a first fluid outlet aperture opening into said at least one of said first pipes; and
   blocking the flow of fluid in said at least one of said first pipes in the direction of extrusion between said first inlet aperture and said first outlet aperture.

3. The method according to claim 2, further comprising making in a middle portion of the preform and from the outside of the preform a second fluid inlet aperture opening into the one of said second pipes and a second fluid outlet aperture opening into the one of said second pipes, a sealing member being interposed along the extrusion direction between the second inlet aperture and the second outlet aperture.

4. The method according to claim, comprising:
   adding fluidic bonding members to ends of the preform so as to:
   create a fluid flow in a first circuit between the first inlet aperture and the first outlet aperture; and
   create a fluid flow in a second circuit between the second inlet aperture and the second outlet aperture.

5. The method according to claim 4, wherein the first inlet aperture is made by forming a recess in the thickness of the preform followed by making holes for fluidic connection to said at least one of said first pipes.

6. The method according to claim 5, wherein the second inlet aperture is made by forming said recess followed by making a hole for fluidic connection to said one of said second pipes.

7. The method according to claim 1, further comprising adding a sealing plate to a middle part of the preform, said sealing plate being provided with fluid passage cut-outs.

8. The method according to claim 7, wherein the sealing plate is covered with a collecting plate provided with fluid connection pipes for the fluid supply to and the fluid outlet from the first and second pipes.

9. A method for manufacturing an annular heat exchanger intended to be mounted on the radially inner or outer face of an annular shell of a casing of a double-flow turbomachine, the method comprising:
   obtaining by extrusion a heat exchanger preform by a die shaped so that the preform comprises:
      first pipes for the circulation of a fluid to be cooled;
      second pipes arranged on either side of the first pipes in a direction perpendicular to a direction of extrusion;
   making a hole from the outside in the preform, said hole leading into one of the second pipes of the preform;
   introducing into said hole of the one of said second pipes a member for partially closing off its passage cross-section; and
   making in a middle portion of the preform and from the outside of the preform a second fluid inlet aperture opening into the one of said second pipes and a second fluid outlet aperture opening into the one of said second pipes,
   wherein a sealing member is interposed along the extrusion direction between the second inlet aperture and the second outlet aperture.

10. A method for manufacturing an annular heat exchanger intended to be mounted on the radially inner or outer face of an annular shell of a casing of a double-flow turbomachine, the method comprising:
   obtaining by extrusion a heat exchanger preform by a die shaped so that the preform comprises:
      first pipes for the circulation of a fluid to be cooled;
      second pipes arranged on either side of the first pipes in a direction perpendicular to a direction of extrusion;
   making a hole from the outside in the preform, said hole leading into one of the second pipes of the preform;
   introducing into said hole of the one of said second pipes a member for partially closing off its passage cross-section; and
   adding a sealing plate to a middle part of the preform, said sealing plate being provided with fluid passage cut-outs.

* * * * *